United States Patent Office 3,733,367
Patented May 15, 1973

3,733,367
PROCESS FOR THE SEPARATION OF STYRENE FROM ETHYL BENZENE
Eli Perry, St. Louis, and William F. Strazik, St. Ann, Mo., assignors to Monsanto Company, St. Louis, Mo.
No Drawing. Filed Mar. 8, 1972, Ser. No. 232,967
Int. Cl. C07c 7/02, 15/10
U.S. Cl. 260—669 A                    5 Claims

ABSTRACT OF THE DISCLOSURE

Styrene is separated from organic mixtures comprising styrene and ethylbenzene by contacting the mixture against one side of a cyanoethyl cellulose membrane withdrawing at the other side a vaporous mixture having increased styrene concentration. The cyanoethyl cellulose employed preferably has a degree of substitution (D.S.) of from about 0.5 to 3.0.

BACKGROUND OF THE INVENTION

Field of the invention

This invention relates to a process for separating styrene from organic mixtures containing same. In a particular aspect this invention relates to a process for the separation of styrene from organic mixtures comprising styrene and ethylbenzene by preferential permeation through a polymer membrane under pervaporation conditions. In a more particular aspect this invention relates to a process for the separation of styrene from organic mixtures comprising styrene and ethylbenzene by contacting said mixtures against one side of a cyanoethyl cellulose membrane and recovering on the other side a vaporous mixture rich in styrene.

Description of the prior art

Separation of styrene from organic mixtures such as mixtures of styrene and ethylbenzene has been accomplished by distillation procedures. Separation of components of azeotropic mixtures of organic materials by pervaporation through polymer membranes is known to the art from U.S. Pat. 2,953,502 issued Sept. 20, 1960 to R. C. Binning and Robert J. Lee. Among the membranes indicated as being useful in such separations are membranes comprised of cellulose and of certain cellulose derivatives.

SUMMARY OF THE INVENTION

It has been discovered in accordance with the present invention that styrene is effectively separated from organic mixtures comprising styrene and ethylbenzene by contacting the mixture against one side of a cyanoethyl cellulose membrane and withdrawing at the second side a vaporous mixture having a higher concentration of styrene than the aforesaid mixture. Cyanoethyl cellulose membranes employed in the process of the present invention are highly efficient in separating styrene from ethylbenzene using pervaporation separation techniques. The present invention is further advantageous in that it permits avoidance of costly distillation procedures.

DETAILED DESCRIPTION

The process of the present invention comprises contacting an organic feed mixture comprising styrene and ethylbenzene against one side of a membrane comprising cyanoethyl cellulose and withdrawing at the second side a mixture having a higher concentration of the preferentially permeable styrene than the aforesaid feed mixture. It is essential that the mixture at the second side be maintained at a lower chemical potential than that on the feed side. It is also essential that the product be withdrawn at the second side in the vapor state. In the commercial utilization of the process, multi-stage operation is feasible since this permits the operation of individual stages at various concentrations and temperatures in order to achieve the optimum driving force for the process.

For each individual stage, the effectiveness of the separation is shown by the separation factor (S.F.).

The separation factor (S.F.) is defined as the ratio of the concentrations of two substances, A and B, to be separated, divided into the ratio of concentrations of the corresponding substances in the permeate, $$S.F. = \frac{(C_A/C_B) \text{ in permeate}}{(C_A/C_B) \text{ in permeant}}$$

where $C_A$ and $C_B$ are the concentrations of the preferentially permeable component and any other component of the mixture or the sume of other components respectively.

In carrying out the process of the present invention, the first or feed side of the membrane is such that the activities of the components are greater than the activities on the second side. Preferably, the first side is about atmospheric pressure and the second side below atmospheric pressure. Still more preferably, the second side is maintained such that the pressure differential is greater than 0.01 atmosphere or preferably from about 0.1 to about 0.5 atmosphere. A further preferred mode of operation is with the second side maintained at a vacuum of greater than 0.2 mm. Hg.

The term "Chemical Potential" is employed herein as described by Olaf A. Hougen and K. M. Watson ("Chemical Process Principles, Part II," John Wiley, New York, 1947). It is related to the escaping tendency of a substance from any particular phase. For an ideal vapor or gas, this escaping tendency is equal to the partial pressure so that it varies greatly with changes in the total pressure. For a liquid, the change in escaping tendency as a function of total pressure is small. The escaping tendency always depends upon the temperature and concentration. In the present invention, the feed substance is typically a liquid solution and the other side of the membrane is maintained such that a vapor phase exists. A vapor feed may be employed when the mixture to be separated is available in that form from an industrial process or when heat economies are to be effected in a multi-stage process.

The feed side may be at pressures less than atmospheric and also at pressures over and above the vapor pressure of the liquid components. The collection or permeate vapor side of the membrane is preferably less than atmospheric pressure but under proper feed side conditions, also may be greater than atmospheric pressure. The total pressure on the feed side is preferably between 0 p.s.i. absolute and 5000 p.s.i.g.

The conditions are always such as to maintain a higher chemical potential on the feed side than on the collection or vapor side.

The temperatures on the feed side and the collection side may vary over a wide range. However, temperatures should be avoided which cause substantial decomposition of any of the organic materials in the mixture or of the membrane and which cause the vapor pressure on the collection side of any of the permeated materials to be exceeded by the pressure being maintained on that side. Typically an increase in temperature causes an increase in permeation rate. A dramatic increase in rate often occurs when the temperature exceeds the glass transition temperature of the cyanoethyl cellulose membrane being used in the separation procedure.

Separations are carried out by removal of the preferentially permeable styrene through the membrane with the said styrene, in a higher concentration than in the feed, being recovered from the collection side of the membrane as a vapor and with the imposition of a state of lower chemical potential on such collection side of the membrane. For example, a mixture of styrene and ethylbenzene may be applied to one side of a flat diaphragm or membrane to accomplish removal of at least a part of the styrene, leaving a more highly concentrated ethylbenzene solution at the feed side of the membrane or diaphram. A state of lower chemical potential is maintained on the collection or downstream side of the membrane by vacuum e.g. from 0.1 mm. to the vapor pressure of the organic component of the mixture which has lowest vapor pressure at the membrane at the respective temperature as long as the vapor phase is present on the downstream side.

In the system referred to above, the styrene selectively passes through the membrane with the styrene-rich composition being rapidly removed as vapor from the collection side of the membrane.

In contrast to the present invention the employment of permeates in liquid phase on the second side of the membrane is impractical because the applied pressure has been found to be prohibitively high, e.g. up to 1,000 atmospheres being necessary because of osmotic pressures. Liquid-liquid permeation is largely an equilibrium phenomenon unless the osmotic forces are overcome while in contrast liquid-vapor or vapor-vapor permeations are rate controlled processes even at moderate conditions in which the vapor is removed as soon as it reached the collection surface of the membrane. Liquid-vapor and vapor-vapor separations are accordingly much more effectively carried out than liquid-liquid separations.

The permeation membrane used in the process of the present invention is cyanoethyl cellulose. It is preferred that the cyanoethyl cellulose has a degree of substitution (D.S.) in the range of from about 0.5 to 3.0 with a degree of substitution in the range from about 1.5 to 3.0 being especially preferred. The molecular weight of the cyanoethyl cellulose may vary over a wide range, but in all cases should be sufficient to permit the polymer to be formed into a film which is sufficiently strong to withstand separation processing conditions. Cyanoethyl cellulose having a molecular weight in the range of from about 50,000 to about 5,000,000 is typically employed.

The membrane may be a simple disk or sheet of the membrane substance which is suitably mounted in a duct or pipe or mounted in a plate and frame filter press. Other forms of membranes may also be employed such as hollow tubes and fibers through which or around which the feed is supplied or recirculated with the product being removed at the other side of the tubes as a vapor. Various other useful shapes and sizes are readily adaptable to commercial installations. The membrane, of course, must be insoluble in the organic separation medium. "Membrane insolubility" as used herein is taken to include that the membrane material is not substantially solution-swellable or sufficiently weakened by its presence in the solution to impart "rubbery" characteristics which cause creep and rupture under the conditions of use, including high pressures.

The membrane may be prepared by any suitable procedure such as, for example, by casting a film or spinning a hollow fiber from a "dope" containing polymer and solvent. Such preparations are well known to the art.

An important control over the separation capacity of a particular membrane is exercised by the method used to form and solidify the membrane (e.g. casting from a melt into controlled atmospheres or from solution into baths at various concentrations and temperatures).

The art of membrane usage is well known with substantial literature being available on membrane support, fluid flow and the like. The present invention is practiced with such conventional procedures and apparatus. The membrane must, of course, be sufficiently thick so as to not rupture under the pressure conditions employed. Typically suitable membranes have a thickness of from about ½ to about 10 mils.

The following example illustrates specific embodiments of the present invention. In the example, the membranes employed were in the form of film discs and were mounted in a membrane holder. All membranes were prepared by casting from solution.

EXAMPLE 1

(A) Membrane permeations were conducted for the purpose of separating styrene from an organic liquid consisting of 70 weight percent styrene and 30 weight percent ethylbenzene using cyanoethyl cellulose membranes. The separations were carried out under pervaporation conditions at 22° C. Each membrane was approximately 1 mil in thickness. In each run, preferential permeation of styrene was effected. In each run, the pressure on the liquid side was atmospheric and the pressure on the vapor side was 0.1 mm. Hg. The results are shown in the table.

(B) For comparative purposes the above procedure was repeated in all essential details with the exception that the membranes employed were cellulose and cellulose triacetate. The results are shown in the table.

The results in the table show that cyanoethyl cellulose membranes are superior to cellulose membranes and cellulose triacetate membranes in separating styrene from ethylbenzene under pervaporation separation conditions.

TABLE

| Run No. | Membrane | Separation factor | Rate×10$^4$ grams/ hour/11.3 cm.$^2$/ mil of membrane thickness |
|---|---|---|---|
| 1 | Cyanoethyl cellulose (D.S. –2.18) | 1.04 | 18 |
| 2 | Cyanoethyl cellulose (D.S. –2.5) | 2.7 | 16 |
| 3 | do | 2.8 | 11 |
| 4 | do | 3.2 | 8 |
| 5 | do | 4.3 | 6 |
| 6 | Cyanoethyl cellulose (D.S. –2.7) | 2.3 | 36 |
| 7 | Cellulose | 1.7 | 1.2 |
| 8 | Cellulose triacetate | 1.5 | 835 |
| 9 | do | 1.6 | 840 |
| 10 | do | 1.3 | 3,000 |

While the invention has been described with reference to particular embodiments thereof, it will be appreciated that modifications and variations are possible without departing from the invention.

What is claimed is:

1. A process for the separation of styrene from an organic mixture comprising styrene and ethylbenzene which comprises contacting the said mixture against one side of a membrane comprising cyanoethyl cellulose and withdrawing at the second side a vaporous mixture having a higher concentration of styrene than the aforesaid feed mixture with the mixture at the second side maintained at a lower chemical potential than at the feed side.

2. The process of claim 1 wherein the pressure on the second side of the membrane is less than atmospheric pressure and lower than the pressure on the other side of the membrane.

3. The process of claim 1 wherein the feed mixture is a liquid mixture.

4. The process of claim 1 wherein the membrane comprises cyanoethyl cellulose having a degree of substitution in the range of from about 0.5 to 3.0.

5. The process of claim 4 wherein the cyanoethyl cellulose has a degree of substitutions in the range of about 1.5 to 3.0.

References Cited

UNITED STATES PATENTS 2,923,749   2/1960   Lee et al. _____ 260—674 R
2,947,687   8/1960   Lee _____ 260—674 R

CURTIS R. DAVIS, Primary Examiner

U.S. Cl. X.R.

260—674 R